(12) United States Patent
Sadler et al.

(10) Patent No.: US 8,323,476 B2
(45) Date of Patent: Dec. 4, 2012

(54) SOLID CATALYST LIQUID PHASE HYDROPROCESSING USING MOVING BED REACTORS

(75) Inventors: Clayton C. Sadler, Arlington Heights, IL (US); Mary Jo Wier, Schaumburg, IL (US); Laurence O. Stine, Western Springs, IL (US); Christopher Naunheimer, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 232 days.

(21) Appl. No.: 12/958,765

(22) Filed: Dec. 2, 2010

(65) Prior Publication Data

US 2011/0147264 A1  Jun. 23, 2011

Related U.S. Application Data

(60) Provisional application No. 61/287,286, filed on Dec. 17, 2009.

(51) Int. Cl.
| | |
|---|---|
| *C10G 65/12* | (2006.01) |
| *C10G 47/00* | (2006.01) |
| *C10G 47/28* | (2006.01) |

(52) U.S. Cl. ............................ 208/59; 208/108; 208/176
(58) Field of Classification Search .................... 208/59, 208/108, 176
See application file for complete search history.

(56) References Cited

U.S. PATENT DOCUMENTS

| | | | |
|---|---|---|---|
| 3,130,006 | A | 4/1964 | Rabo et al. |
| 4,133,743 | A | 1/1979 | Boret et al. |
| 4,172,027 | A | 10/1979 | Ham et al. |
| 4,363,718 | A | 12/1982 | Klotz |
| 5,409,598 | A | 4/1995 | Kramer et al. |
| 5,849,976 | A | 12/1998 | Gosling et al. |
| 7,414,167 | B2 | 8/2008 | Kalnes et al. |
| 7,842,180 | B1 | 11/2010 | Leonard et al. |

OTHER PUBLICATIONS

Schmitz, "Deep Desulfurization of Diesel Oil Kinetic Studies and Process-Improvment by the Use of a Two-Phase Reactor with Pre-Saturator",Chemical Engineering Science, 2004, pp. 2821-2829, vol. 59.

*Primary Examiner* — Randy Boyer
(74) *Attorney, Agent, or Firm* — Maryann Maas

(57) ABSTRACT

Systems and processes for the hydroprocessing of a hydrocarbonaceous feed are provided that utilize a plurality of moving bed reactors. The reactors may be moving bed radial flow reactors. A hydrogen injection point can be provided prior to each reactor by providing a mixer that mixes hydrogen with a hydrocarbonaceous feed, or with the effluent stream from an upstream reactor, to produce a reactor feed stream. Catalyst can be provided from the reaction zone of one reactor to the reaction zone of a downstream reactor through catalyst transfer pipes, and can be regenerated after passing through the reaction zones of the reactors. The moving bed reactors can be stacked in one or more reactor stacks.

22 Claims, 3 Drawing Sheets

SOLID CATALYST LIQUID PHASE HYDROPROCESSING USING MOVING BED REACTORS

CROSS REFERENCE TO RELATED APPLICATION

This application claims the benefit of priority of U.S. Provisional Application 61/287,286, filed Dec. 17, 2009, the contents of which are hereby incorporated by reference in its entirety.

FIELD OF THE INVENTION

The field generally relates to liquid phase or substantially liquid phase hydroprocessing of hydrocarbon streams and, more particularly, to catalytic hydrocracking and hydrotreating of hydrocarbon streams using a solid catalyst in moving bed reactors.

BACKGROUND

Petroleum refiners often produce desirable products such as turbine fuel, diesel fuel, middle distillates, naphtha, and gasoline boiling hydrocarbons among others by hydroprocessing a hydrocarbon feed stock derived from crude oil or heavy fractions thereof. Hydroprocessing can include, for example, hydrocracking, hydrotreating, hydrodesulfurization and the like. Feed stocks subjected to hydroprocessing can be vacuum gas oils, heavy gas oils, and other hydrocarbon streams recovered from crude oil by distillation. For example, a typical heavy gas oil comprises a substantial portion of hydrocarbon components boiling above about 371° C. (700° F.) and usually at least about 50 percent by weight boiling above 371° C. (700° F.), and a typical vacuum gas oil normally has a boiling point range between about 315° C. (600° F.) and about 565° C. (1050° F.).

Hydroprocessing is a process that uses a hydrogen-containing gas with suitable catalyst(s) for a particular application. In many instances, hydroprocessing is generally accomplished by contacting the selected feed stock in a reaction vessel or zone with the suitable catalyst under conditions of elevated temperature and pressure in the presence of hydrogen as a separate phase in a three-phase system (gas/liquid/solid catalyst). Such hydroprocessing is commonly undertaken in a trickle-bed reactor where the continuous phase is gaseous and not liquid.

In the trickle bed reactor, an excess of the hydrogen gas is present in the continuous gaseous phase. In many instances, a typical trickle-bed hydroprocessing reactor requires up to about 1778 nm$^3$/m$^3$ (10,000 SCF/B) of hydrogen at pressures up to 17.3 MPa (2500 psig) to effect the desired reactions. However, even though the trickle bed reactor has a continuous gaseous phase due to the excess hydrogen gas, it is believed that the primary reactions are taking place in the liquid-phase in contact with the catalyst, such as in the liquid filled catalyst pores. As a result, for the hydrogen gas to get to the active sites on the catalyst, the hydrogen must first diffuse from the gas phase into the liquid-phase and then through the liquid to the reaction site adjacent the catalyst.

While not intending to be limited by theory, under some hydroprocessing conditions the hydrogen supply available at the catalytic reaction site may be a rate limiting factor in the hydroprocessing conversions. For example, hydrocarbon feed stocks can include mixtures of components having greatly differing reactivities. While it may be desired, for example, to reduced the nitrogen content of a vacuum gas oil to very low levels prior to introducing it as a feed to a hydrocracking reactor, the sulfur containing compounds of the vacuum gas oil will also undergo conversion to hydrogen sulfide. Many of the sulfur containing compounds tend to react very rapidly at the operating conditions required to reduce the nitrogen content to the desired levels for hydrocracking. The rapid reaction rate of the sulfur compounds to hydrogen sulfide will tend to consume hydrogen that is available within the catalyst pore structure thus limiting the amount of hydrogen available for other desired reactions, such as denitrogenation. This phenomenon is most acute within the initial portions (i.e., about 50 to about 75 percent) of the reaction zones. Under such circumstances with the rapid reaction rate of sulfur compounds, for example, it is believed that the amount of hydrogen available at the active catalyst sites can be limited by the diffusion of the hydrogen through the feed (especially at the initial portions of the reactor). In these circumstances, if the diffusion of hydrogen through the liquid to the catalyst surface is slower than the kinetic rates of reaction, the overall reaction rate of the desired reactions (i.e., denitrogenation, for example) may be limited by the hydrogen supply and diffusion. In one effort to overcome the limitations posed by this phenomenon (hydrogen depletion), hydroprocessing catalysts can be manufactured in small shapes such as tri-lobes and quadric-lobes where the dimension of the lobe may be on the order of 1/30 inch. However, such small catalyst dimensions also can have the shortcoming of creating larger pressure drops in the reactor due to the more tightly packed catalyst beds.

Two-phase hydroprocessing (i.e., a liquid hydrocarbon stream and solid catalyst) has been proposed to convert certain hydrocarbon streams into more valuable hydrocarbon streams in some cases. For example, the reduction of sulfur in certain hydrocarbon streams may employ a two-phase reactor with pre-saturation of hydrogen rather than using a traditional three-phase system. See, e.g., Schmitz, C. et al., "Deep Desulfurization of Diesel Oil: Kinetic Studies and Process-Improvement by the Use of a Two-Phase Reactor with Pre-Saturator," Chem. Eng. Sci., 59:2821-2829 (2004). These two-phase systems only use enough hydrogen to saturate the liquid-phase in the reactor. As a result, the reactor systems of Schmitz et al. have the shortcoming that as the reaction proceeds and hydrogen is consumed, the reaction rate decreases due to the depletion of the dissolved hydrogen. As a result, such two-phase systems as disclosed in Schmitz et al. are limited in practical application and in maximum conversion rates.

As discussed above, conventional hydroprocessing operations utilize trickle bed technology. This technology necessitates the use of large amounts of hydrogen relative to the hydrocarbon feedstock, sometimes exceeding 1685 nm$^3$/m$^3$ (10,000 SCF/B), and requires the use of costly recycle gas compression. The large amounts of hydrogen relative to the hydrocarbon feedstock in conventional hydroprocessing operations renders this type of operation a gas phase continuous system. U.S. Ser. No. 11/300,007 teaches that it is neither economical nor necessary to have this large excess of hydrogen to effect the desired conversion. The desired conversion can be effected with much less hydrogen, and can be economically and efficiently performed with only sufficient hydrogen to ensure a liquid phase continuous system. A liquid phase continuous system would exist at one extreme with only sufficient hydrogen to fully saturate the hydrocarbon feedstock and at the other extreme where sufficient hydrogen is added to transition to a gas phase continuous system. The amount of hydrogen that is added between these two extremes is dictated by economic considerations. Operation with a liquid phase continuous system avoids the high costs associated with a recycle gas compressor.

Other uses of liquid-phase reactors to process certain hydrocarbonaceous streams require the use of diluent/solvent streams to aid in the solubility of hydrogen in the unconverted oil feed and require limits on the amount of gaseous hydrogen in the liquid-phase reactors. For example, liquid-phase hydrotreating of a diesel fuel has been proposed, but requires a recycle of hydrotreated diesel as a diluent blended into the oil feed prior to the liquid-phase reactor. In another example, liquid-phase hydrocracking of vacuum gas oil is proposed, but likewise requires the recycle of hydrocracked product into the feed to the liquid-phase hydrocracker as a diluent. In each system, dilution of the feed to the liquid-phase reactors is required in order to effect the desired reactions. Because hydrotreating and hydrocracking typically require large amounts of hydrogen to effect their conversions, a large hydrogen demand is still required even if these reactions are completed in liquid-phase systems. As a result, to maintain such a liquid-phase hydrotreating or hydrocracking reaction and still provide the needed levels of hydrogen, the diluent or solvent of these prior liquid-phase systems is required in order to provide a larger relative concentration of dissolved hydrogen as compared to unconverted oil to insure adequate conversions can occur in the liquid-phase hydrotreating and hydrocracking zones. As such, larger and more complex liquid-phase systems are needed to achieve the desired conversions that still require large supplies of hydrogen.

These prior systems also may permit the presence of some hydrogen gas in the liquid-phase reactors, but the systems are generally limited to about 10 percent or less hydrogen gas by total volume of the reactor. Depending on the feed compositions and operating conditions, such limits on hydrogen gas in the liquid-phase system tend to restrict the overall reaction rates and the per-pass conversion rates in such liquid-phase reactors.

Furthermore, there are distinct advantages to operating in a moving bed mode as opposed to a fixed bed mode. For example, fixed catalyst beds deactivate over time resulting in a declining level of performance. Moving beds, on the other hand, enable deactivated catalyst to be removed and fresh or regenerated catalyst to be added to the reactor to provide a continuous level of performance. Generally speaking, a moving bed operation requires less catalyst and less hydrocarbon inventory than a fixed bed operation of the same capacity, see U.S. Pat. No. 5,849,976.

Similarly, there are advantages to multiple moving bed reaction zones over a single moving bed process. Multiple reaction zone enable the liquid effluent to be mixed with additional hydrogen. Increasing the number of hydrogen mix points reduces the amount of liquid recycle. Lower liquid recycle reduces the capital and operating costs of the unit. Also, multiple reaction zone beds enable the liquid effluent from each reaction zone bed to be cooled. Increasing the number of cooling points can reduce the liquid recycle if the cooling achieved by mixing with hydrogen is not sufficient.

Although a wide variety of process flow schemes, operating conditions and catalysts have been used in commercial petroleum hydrocarbon conversion processes, there is always a demand for new methods and flow schemes that provide more useful products and improved product characteristics. In many cases, even minor variations in process flows or operating conditions can have significant effects on both quality and product selection. There generally is a need to balance economic considerations, such as capital expenditures and operational utility costs, with the desired quality of the produced products.

SUMMARY OF THE INVENTION

The systems and processes described herein relate to liquid phase hydroprocessing using a solid catalyst in moving bed reactors.

In one embodiment of the invention, the hydroprocessing process comprises providing at least two moving bed reactors, the moving bed reactors including: a first moving bed reactor including a first reaction zone containing catalyst; and a second moving bed reactor including a second reaction zone containing catalyst; transferring catalyst, periodically or continuously, from the first reaction zone of the first moving bed reactor to the second reaction zone of the second moving bed reactor; passing a liquid feed stream comprising a hydrocarbonaceous feed stream and hydrogen to the first reactor, wherein the liquid feed stream undergoes a hydroprocessing reaction in the first reaction zone to produce a first reactor effluent stream, and first reactor effluent stream is removed from an outlet of the first reactor; passing the first reactor effluent stream though one or more unit operations wherein the pressure of the first reaction zone effluent stream at the first unit operation is lower than the pressure of the first reactant effluent stream at the outlet of the first reaction zone, and the pressure at the inlet of all subsequent unit operations is lower than the prior upstream operation, to generate a liquid phase stream; passing the liquid phase stream to the second reaction zone, the liquid phase stream having a pressure at the second reaction zone inlet that is lower than a pressure of the liquid phase stream at the inlet of the last unit operation, wherein the liquid phase stream undergoes hydroprocessing to generate a second reactor effluent stream; and passing the second reactor stream from the second or a final reaction zone to a product recovery zone. In one embodiment, a first unit operation is a mixing device in which the first reactor effluent stream is mixed with a stream selected from the group consisting of a gas stream containing hydrogen and a liquid phase hydrocarbonaceous stream to generate a mixing device effluent. In another embodiment a second unit operation may be a separation device wherein the mixing device effluent is separated into a vapor portion and a liquid portion. In still another embodiment, a unit operation may be a cooling device wherein the first reactor effluent stream is cooled prior to entering the second reaction zone.

In a second aspect, a hydroprocessing process for the hydrotreating and or hydrocracking of a hydrocarbon is provided that includes the steps of: providing a plurality of moving bed radial flow reactors configured in at least one vertical reactor stack having a top and a bottom, transferring catalyst from the first reaction zone of the first moving bed radial flow reactor to the second reaction zone of the second moving bed radial flow reactor through at least one catalyst transfer pipe, passing a hydrocarbon feed stream and a first portion of a hydrogen containing gas stream to a first mixer that produces a first reactor feed stream, providing the first reactor feed stream from the first mixer to the first reactor that produces a first reactor effluent stream, passing the first reactor effluent stream and a second portion of the hydrogen containing gas stream to a second mixer that produces a second reactor feed stream, and providing the second reactor feed stream from the second mixer to the second reactor.

Additionally, the plurality of moving bed radial flow reactors can include a first moving bed radial flow reactor including a first outer annulus, a first centerpipe having a first centerpipe outlet, and a first reaction zone containing catalyst; and a second moving bed radial flow reactor including a second outer annulus, a second centerpipe having a first centerpipe outlet, and a second reaction zone containing catalyst.

The first reactor feed stream can be received by the first outer annulus of the first moving bed radial flow reactor, can flow radially inward through the first reaction zone towards the first centerpipe, and can undergo an hydroprocessing reaction in the first reaction zone to produce a first reactor effluent stream. The first reactor effluent stream can be removed from the first reactor through the first centerpipe outlet. The pressure of the of the first reactor effluent stream at the second mixer inlet is lower than the first reactor effluent stream when it is removed from the first centerpipe. Additionally, the pressure of the second reactor feed stream is lower than the first reactor effluent stream at the second mixer inlet. The second reactor feed stream can be received by the second outer annulus, can flow radially inward through the second reaction zone towards the second centerpipe, and can undergo an hydroprocessing reaction in the second reaction zone to produce a second reactor effluent stream. Finally, the second reactor effluent stream can be removed from the second reactor through the second centerpipe outlet.

In additional embodiments of the invention, the liquid flow in the radial flow reactor may flow radially outward from the centerpipe to the annulus or the invention cold utilize downflow moving bed systems as described in U.S. Pat. No. 5,849,976.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
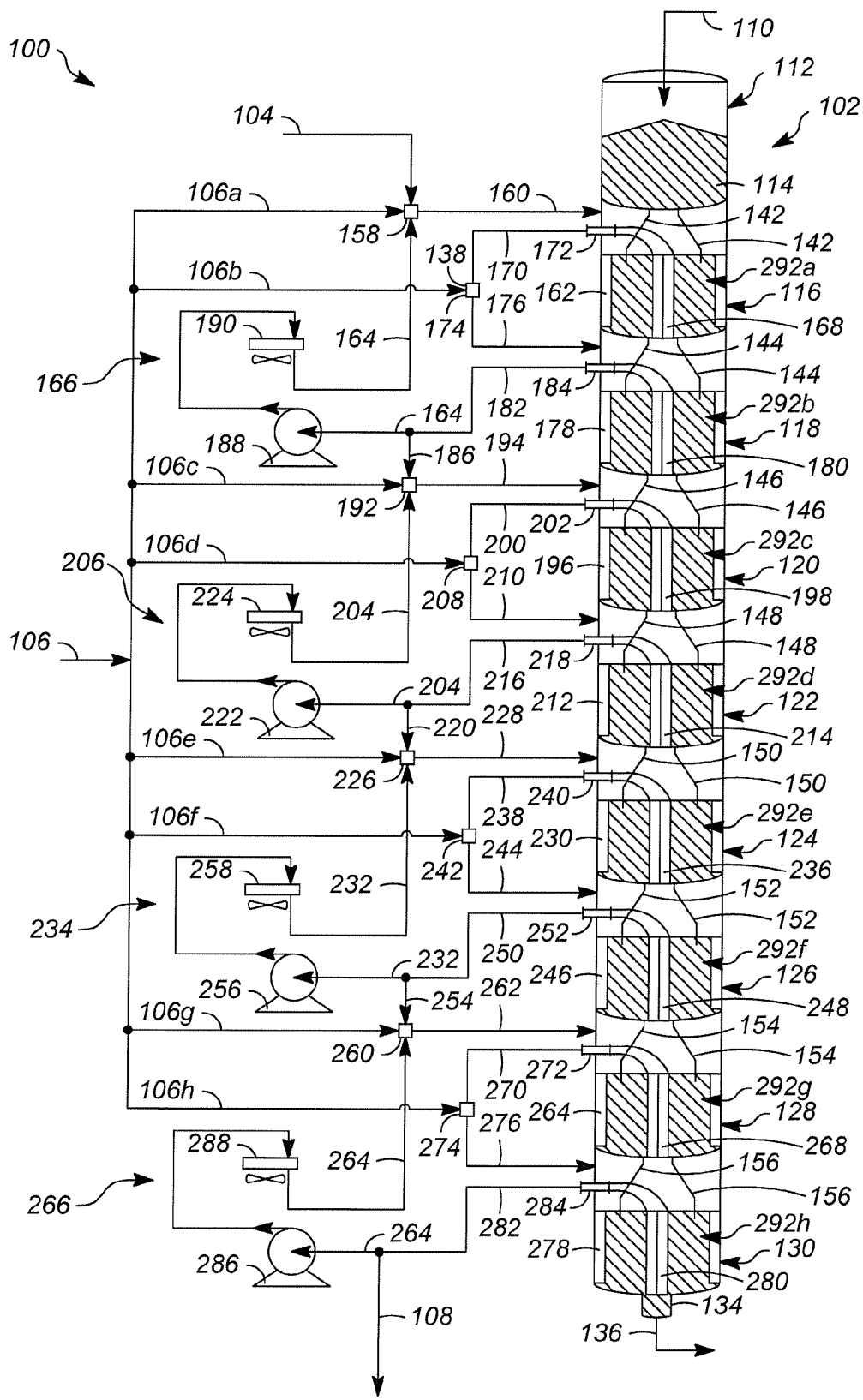
FIG. 1 illustrates one example of a hydroprocessing system utilizing a single stack of reactors.

The process of the present invention is particularly useful for hydroprocessing operations, such as hydrocracking a hydrocarbon oil containing hydrocarbons and/or other organic materials to produce a product containing hydrocarbons and/or other organic materials of lower average boiling point and lower average molecular weight. The hydrocarbon feedstocks that may be subjected to hydrocracking by the method of the invention include all mineral oils and synthetic oils (e.g., shale oil, tar sand products, etc.) and fractions thereof. Illustrative hydrocarbon feedstocks include those containing components boiling above 288° C. (550° F.), such as atmospheric gas oils, vacuum gas oils, deasphalted, vacuum, and atmospheric residua, hydrotreated or mildly hydrocracked residual oils, coker distillates, straight run distillates, solvent-deasphalted oils, pyrolysis-derived oils, high boiling synthetic oils, cycle oils and cat cracker distillates. A preferred hydrocracking feedstock is a gas oil or other hydrocarbon fraction having at least 50% by weight, and most usually at least 75% by weight, of its components boiling at a temperature above about 288° C. (550° F.). One of the most preferred gas oil feedstocks will contain hydrocarbon components which boil above 288° C. (550° F.) with best results being achieved with feeds containing at least 25 percent by volume of the components boiling between 315° C. (600° F.) and 565° C. (1050° F.).

Another example of a hydroprocessing operation suitable for this invention is a hydrotreating operation. Here, the selected hydrocarbonaceous feedstock and hydrogen are introduced into a hydrotreating reaction zone at hydrotreating reaction conditions. Preferred hydrotreating reaction conditions include a temperature from about 204° C. (400° F.) to about 482° C. (900° F.), a pressure from about 3.5 MPa (500 psig) to about 17.3 MPa (2500 psig), a liquid hourly space velocity of the fresh hydrocarbonaceous feedstock from about 0.1 $hr^{-1}$ to about 10 $hr^{-1}$ with a hydrotreating catalyst or a combination of hydrotreating catalysts. Only enough hydrogen is introduced into the hydrotreating reaction zone to maintain a liquid phase continuous. The present invention operates in a liquid phase continuous system.

The term "hydrotreating" as used herein refers to a process wherein a hydrogen-containing treat gas absorbed in the liquid hydrocarbon is used in the presence of suitable catalysts which are primarily active for the removal of heteroatoms, such as sulfur and nitrogen from the hydrocarbon feedstock. Suitable hydrotreating catalysts for use in the present invention are any known conventional hydrotreating catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable hydrotreating catalysts include zeolitic catalysts, as well as noble metal catalysts where the noble metal is selected from palladium and platinum. It is within the scope of the present invention that more than one type of hydrotreating catalyst be used in the same reaction vessel. The Group VIII metal is typically present in an amount ranging from about 2 to about 20 weight percent, preferably from about 4 to about 12 weight percent. The Group VI metal will typically be present in an amount ranging from about 1 to about 25 weight percent, preferably from about 2 to about 25 weight percent.

The resulting effluent from the hydrotreating reaction zone may be cooled to a temperature in the range from about 4.4° C. (40° F.) to about 60° C. (140° F.) and introduced into a vapor-liquid separator preferably operated at a pressure from about 3.5 MPa (500 psig) to about 17.3 MPa (2500 psig) to provide a vapor stream comprising hydrogen, hydrogen sulfide, ammonia and normally gaseous hydrocarbons, and a hydrocarbonaceous stream comprising hydrocarbons having a reduced level of sulfur and nitrogen.

The hydrocarbonaceous stream comprising hydrocarbons having a reduced level of sulfur and nitrogen provided by the previous vapor-liquid separator may be introduced into a subsequent vapor-liquid separator operated at a lower pressure to flash any additional normally gaseous hydrocarbons. The resulting liquid hydrocarbonaceous stream from the second vapor-liquid separator is separated, preferably by fractionation, to provide desired product streams such as for example gasoline and diesel and a high boiling hydrocarbonaceous stream comprising unconverted hydrocarbons boiling in the range of the hydrocarbonaceous feedstock.

As mentioned above, hydrocracking is another hydroprocessing process that may be conducted using the present invention. For example, a stream containing hydrocarbonaceous compounds boiling at a temperature greater than about 343° C. (650° F.) is introduced into a hydrocracking zone along with added hydrogen in an amount sufficiently low to maintain a liquid phase or substantially liquid phase continuous system. The hydrocracking zone may contain one or more beds of the same or different catalyst. In one embodiment, when the preferred products are middle distillates, the preferred hydrocracking catalysts utilize amorphous bases or low-level zeolite bases combined with one or more Group VIII or Group VIB metal hydrogenating components. In another embodiment, when the preferred products are in the gasoline boiling range, the hydrocracking zone contains a catalyst which comprises, in general, any crystalline zeolite cracking base upon which is deposited a minor proportion of a Group VIII metal hydrogenating component. Additional hydrogenating components may be selected from Group VIB for incorporation with the zeolite base. The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and 14 Angstroms ($10^{-10}$ meters). It is preferred to employ zeolites having a relatively high silica/alumina mole ratio between about 3 and 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms ($10^{-10}$ meters), wherein the silica/alumina mole ratio is about 4 to 6. A prime example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006 B1.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. The preferred cracking bases are those which are at least about 10 percent, and preferably at least 20 percent, metal-cation-deficient, based on the initial ion-exchange capacity. A specifically desirable and stable class of zeolites are those wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and 30 percent by weight may be used. In the case of the noble metals, it is normally preferred to use about 0.05 to about 2 weight percent. The preferred method for incorporating the hydrogenating metal is to contact the zeolite base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., 371°-648° C. (700°-1200° F.) in order to activate the catalyst and decompose ammonium ions. Alternatively, the zeolite component may first be pelleted, followed by the addition of the hydrogenating component and activation by calcining. The foregoing catalysts may be employed in undiluted form, or the powdered zeolite catalyst may be mixed and copelleted with other relatively less active catalysts, diluents or binders such as alumina, silica gel, silica-alumina cogels, activated clays and the like in proportions ranging between 5 and 90 weight percent. These diluents may be employed as such or they may contain a minor proportion of an added hydrogenating metal such as a Group VIB and/or Group VIII metal.

Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718 B1 (Klotz).

The hydrocracking of the hydrocarbonaceous feedstock in contact with a hydrocracking catalyst is conducted in the presence of sufficiently low concentrations of hydrogen to maintain a liquid phase or substantially liquid phase continuous system and preferably at hydrocracking reactor conditions which include a temperature from about 232° C. (450° F.) to about 468° C. (875° F.), a pressure from about 3.5 MPa (500 psig) to about 17.3 MPa (2500 psig) and a liquid hourly space velocity (LHSV) from about 0.1 to about 30 $hr^{-1}$. In accordance with the present invention, the term "substantial conversion to lower boiling products" is meant to connote the conversion of at least 5 volume percent of the fresh feedstock, and the term "substantially liquid phase" is meant to describe a phase that is at least 80% liquid by volume. In a preferred embodiment, the per pass conversion in the hydrocracking zone is in the range from about 15% to about 75%. More preferably the per pass conversion is in the range from about 20% to about 60%. Then the ratio of unconverted hydrocarbons boiling in the range of the hydrocarbonaceous feedstock to the hydrocarbonaceous feedstock is from about 1:5 to about 3:5.

During the conversions or reactions occurring in the hydroprocessing reaction zones, hydrogen is necessarily consumed and must be replaced by one or more hydrogen inlet points located in the reaction zones. The amount of hydrogen added at these locations is controlled to ensure that the system operates as a liquid phase continuous system. The limiting amount of hydrogen that may be added is that amount which causes a transition from a liquid phase continuous system or a substantially liquid phase continuous system to a vapor phase continuous system.

FIG. 1 illustrates one example of an hydroprocessing system, illustrated generally at 100. Hydroprocessing system 100 is a solid catalyst hydroprocessing process, and can be utilized for hydrotreating and hydrocracking a vacuum gas oil. For example, hydroprocessing system 100 may contain a first reaction zone directed toward hydrotreating, followed by another reaction zone directed toward hydrocracking. Or perhaps an application calls for only hydrotreating, or only hydrocracking, in which case only one type of catalyst may be employed. For ease of discussion, the drawings will be discussed as applied to hydrotreating only. One of ordinary skill in the art would readily understand how to apply the same system to a hydrocracking step and one would also understand how to have a process that employed both hydrotreating followed by hydroprocessing.

Hydroprocessing system 100 includes a plurality of moving bed radial flow reactors. Note that radial flow is not required in the invention. Each moving bed radial flow reactor can include a reaction zone in which the hydrotreating reaction occurs. Preferred hydrotreating reaction conditions include a temperature from about 204° C. (400° F.) to about 482° C. (900° F.), a pressure from about 3.5 MPa (500 psig) to about 17.3 MPa (2500 psig), a liquid hourly space velocity of the fresh hydrocarbonaceous feedstock from about 0.1 $hr^{-1}$ to about 10 $hr^{-1}$ with a hydrotreating catalyst or a combination of hydrotreating catalysts.

The plurality of moving bed radial flow reactors can include from about four moving bed radial flow reactors to about thirty moving bed radial flow reactors. In one example, the plurality of moving bed radial flow reactors can be configured in at least one vertical reactor stack having a top and a bottom. In a second example, the plurality of moving bed radial flow reactors can be configured in at least a first vertical reactor stack and a second vertical reactor stack. The plurality of moving bed radial flow reactors can be configured in more than two vertical reactor stacks.

Figure 3:
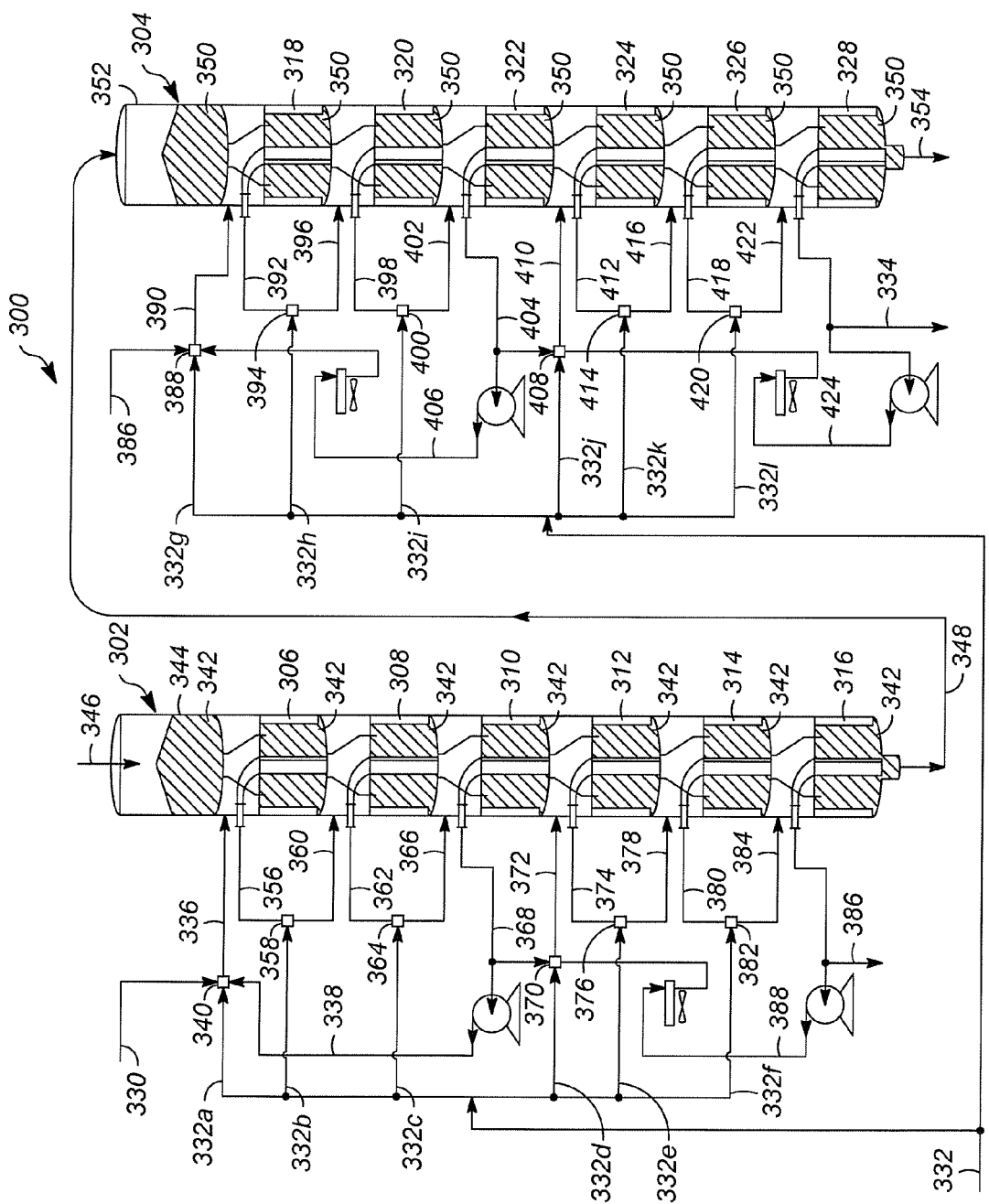
FIG. 3 illustrates one example of a hydroprocessing system utilizing a double stack of reactors.

Some examples of hydroprocessing systems and processes described herein can include one reactor stack, or a plurality of reactor stacks. In one example, a vertical reactor stack can include at least the four moving bed radial flow reactors. As illustrated in FIG. 1, vertical reactor stack 102 has eight moving bed radial flow reactors, including first moving bed radial flow reactor 116, second moving bed radial flow reactor 118, third moving bed radial flow reactor 120, fourth moving bed radial flow reactor 122, fifth moving bed radial flow reactor 124, sixth moving bed radial flow reactor 126, seventh moving bed radial flow reactor 128, and eighth moving bed radial flow reactor 130. As illustrated in FIG. 3, hydroprocessing system 300 includes a first vertical reactor stack 302 and a second vertical reactor stack 304. First vertical reactor stack 302 has six moving bed radial flow reactors, including first moving bed radial flow reactor 306, second moving bed radial flow reactor 308, third moving bed radial flow reactor 310, fourth moving bed radial flow reactor 312, fifth moving bed radial flow reactor 314, and sixth moving bed radial flow reactor 316. Second vertical reactor stack 304 also has six moving bed radial flow reactors, including first moving bed radial flow reactor 318, second moving bed radial flow reactor 320, third moving bed radial flow reactor 322, fourth moving bed radial flow reactor 324, fifth moving bed radial flow reactor 326, and sixth moving bed radial flow reactor 328. In an hydroprocessing system having two or more vertical reactor stacks, the vertical reactor stacks can have the same number of moving bed radial flow reactors, or different numbers of moving bed radial flow reactors.

The number of radial flow reactors to be used in an hydroprocessing system can be determined by evaluating the benefit of an additional hydrogen injection point and the corresponding decrease in circulating liquid against the costs associated with adding an additional reactor. As reactors are added to a reactor stack, the stack increases in height, and it is preferred that reactor stacks be limited in height for practical considerations. Accordingly, it is preferred that two or more reactor stacks be utilized for hydroprocessing systems that include more than eight reactors. Although, it is recognized that two or more reactor stacks can be utilized for hydroprocessing systems that include eight reactors or less, and that it can be possible to utilize one reactor stack hydroprocessing systems that include more than eight reactors.

Referring back to FIGS. 1 and 2, a vacuum gas oil feed stream 104 and a gas feed stream comprising hydrogen 106 can be provided through lines to the reactor stack 102 to produce an effluent product stream 108. The effluent product stream 108 can be in a liquid phase. The gas phase comprising hydrogen is preferably divided into portions, and an hydrogen injection point is preferably provided for each moving bed radial flow reactor in the reactor stack 102. The vacuum gas oil and the gas stream comprising hydrogen can be provided to any of the moving bed radial flow reactors in a reactor feed stream, and the reactor feed stream can have a ratio of hydrocarbonaceous feed to hydrogen feed of from about 5:1 to about 15:1. The reactor feed streams can be in a liquid phase.

To promote the desired hydroprocessing reaction, a catalyst stream 110 containing catalyst 114 can be provided the reaction zone of each moving bed radial flow reactor. Catalyst 114 can contain regenerated catalyst, fresh catalyst, or a combination of regenerated catalyst and fresh catalyst. As illustrated in FIG. 1, the vertical reactor stack 102 also includes a catalyst surge vessel 112 at the top of the vertical reactor stack 102 above the first moving bed radial flow reactor 116, and catalyst 114 can be provided to the catalyst surge vessel 112. Catalyst surge vessel 112 can then provide catalyst 114 to the reactors in the reactor stack 102.

The catalyst 114 can be transferred to each reactor of the reactor stack 102 via gravity. As catalyst 114 is provided to the catalyst surge vessel 112 in catalyst stream 110. The catalyst surge vessel can provide catalyst 114 to the first moving bed radial flow reactor 116 through at least one catalyst transfer pipe 142. As illustrated in FIG. 1, catalyst 114 can flow downwardly from the catalyst surge vessel 112 to the first reactor 116 through two catalyst transfer pipes 142.

Figure 2:
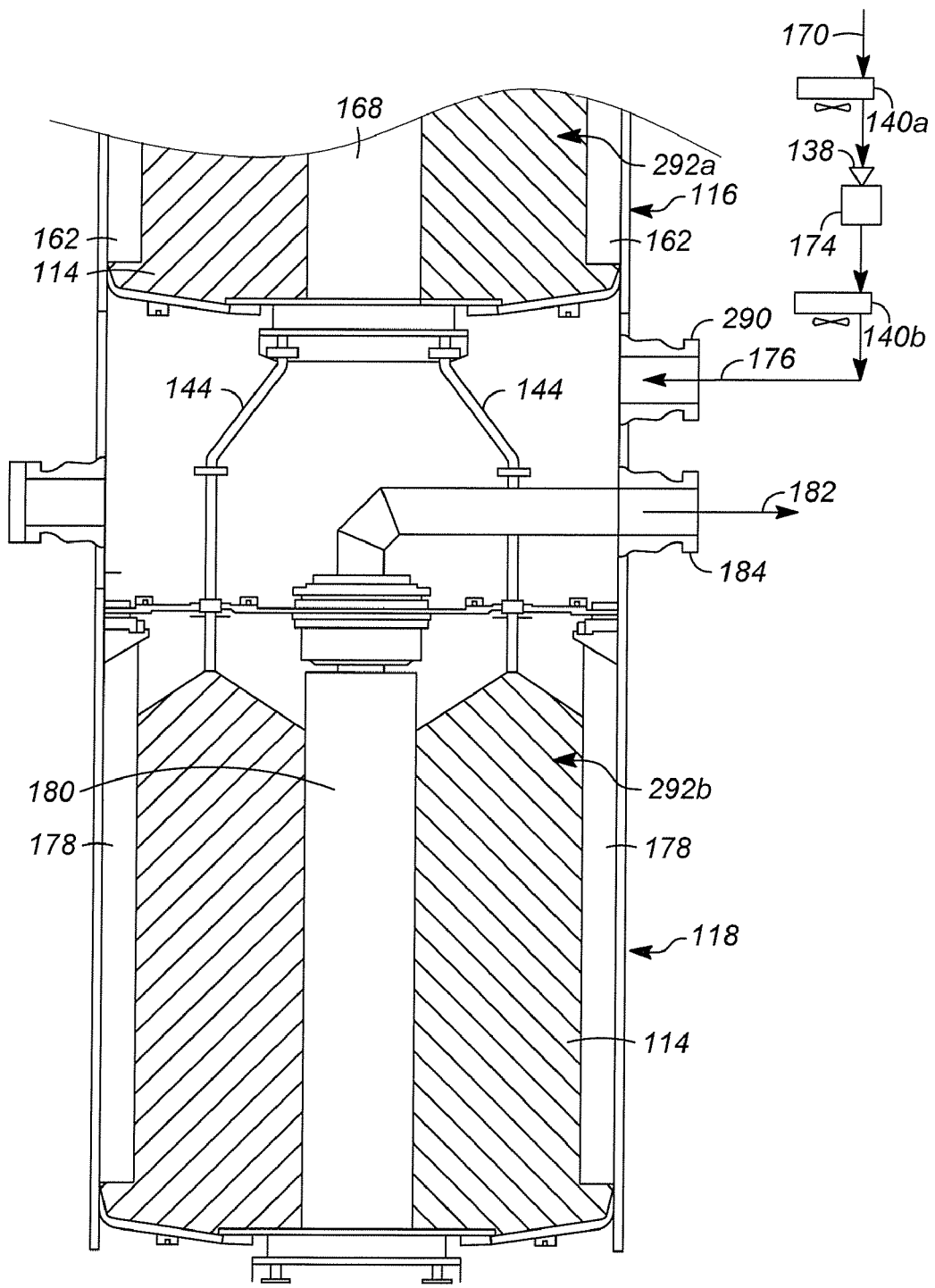
FIG. 2 illustrates a detail view of one reactor in the reactor stack of FIG. 1.

Referring to FIGS. 1 and 2, catalyst 114 can flow downwardly through the first reactor 116 via gravity, and can flow into the second reactor 118. For example, catalyst from the first reaction zone of the first moving bed radial flow reactor 116 can be transferred to the second reaction zone of the second moving bed radial flow reactor 118 through at least one catalyst transfer pipe 144. As illustrated in FIGS. 1 and 2, catalyst 114 can flow downwardly from the first reactor 116 to the second reactor 118 through two catalyst transfer pipes 144.

In the example illustrated in FIG. 1, there are at least two catalyst transfer pipes that transfer catalyst from each reactor to each subsequent reactor. In an alternative example, a single catalyst transfer pipe can be used to transfer catalyst from any one reactor to another reactor. The catalyst transfer pipes can be any suitable size. For example, catalyst transfer pipes can be sized to provide sufficient pressure drop for the mixers described below, while bypassing less than about 5% of the total reactor flow across the catalyst pipes.

As illustrated in FIGS. 1 and 2, catalyst 114 can be received by the second reactor 118 from the catalyst transfer pipes 144, and can flow downwardly through the second reactor 118 via gravity. Catalyst 114 can flow into the third reactor 120 via catalyst transfer pipes 146. Catalyst 114 can flow downwardly through the third reactor 120 via gravity, and can flow into the fourth reactor 122 through catalyst transfer pipes 148. Catalyst 114 can flow downwardly through the fourth reactor 122 via gravity, and can flow into the fifth reactor 124 through catalyst transfer pipes 150. Catalyst 114 can flow downwardly through the fifth reactor 124 via gravity, and can flow into the sixth reactor 126 through catalyst transfer pipes 152. Catalyst 114 can flow downwardly through the sixth reactor 126 via gravity, and can flow into the seventh reactor 128 through catalyst transfer pipes 154. Catalyst 114 can flow downwardly through the seventh reactor 128 via gravity, and can flow into the eighth reactor 130 through catalyst transfer pipes 156. In this manner, catalyst 114 flows via gravity through each reactor in the reactor stack 102. Catalyst particles flow through the first reactor as a dense phase annular moving bed. At the outlet of first reactor, catalyst particles flow through catalyst transfer pipes before entering the second reactor. An aspect of the invention is the design of the catalyst transfer pipes. The catalyst transfer pipes are designed to transport the required flow of catalyst particles while minimizing the flow of process fluid. Process fluid that flows through the catalyst transfer pipes passes directly from the outlet of the upstream reactor to the next downstream reactor and bypassing the intended path of the process liquid through the unit operations between the upstream and downstream reactors.

It has been discovered that a key parameter in the design of the catalyst transfer pipes is the downward velocity of the liquid in the catalyst transfer pipes relative to the downward velocity of the catalyst particles. Low relative liquid velocities result in insufficient catalyst particle flow capacity of the catalyst transfer pipes. Also, low relative liquid velocities require increasing the catalyst transfer pipe length in order to develop the required liquid hydraulic resistance across the catalyst transfer pipe to balance the liquid hydraulic resistance through the unit operations between adjacent reactors.

High relative liquid velocities result in elevated liquid flow rates through the catalyst transfer pipes, which bypass the intended path of process liquid through the unit operations between adjacent reactors. High relative liquid velocities can also result in fluidization of the catalyst particles. Fluidization of the catalyst particles is very undesirable since it will likely lead to the breakage of catalyst particles. Fluidization of catalyst particles in the catalyst transfer pipes also dramatically reduces the liquid hydraulic resistance in the catalyst transfer pipes resulting in significantly higher liquid flow rates passing through the catalyst transfer pipes.

It has been found the range of relative liquid velocities in catalyst transfer pipes is typically required to be between 2 and 64 cm/s (0.07 and 2.1 feet per second) and the preferred range is between 3 and 79 cm/s (0.11 and 1.6 feet per second). In another embodiment the range of relative liquid velocities in catalyst transfer pipes may be between 1.5 and 123 cm/s (0.05 and 4.0 feet per second) and the preferred range between 3 and 76 cm/s (0.1 and 2.5 feet per second).

In each reactor in reactor stack 102, the catalyst can be utilized to react at least a portion of the hydrocarbon feed stream and at least a portion of the hydrogen feed stream to produce hydrotreated effluent. As catalyst 114 is utilized in each of the reactors in the reactor stack 102, it can become deactivated. Deactivated catalyst can be removed from the bottom of the vertical reactor stack 102 in a deactivated catalyst stream 136 via an outlet 134, and a deactivated catalyst stream 136 can be provided to a catalyst regenerator (not shown), which can be a continuous catalyst regenerator, and the deactivated catalyst can be regenerated to produce regenerated catalyst. The regenerated catalyst can be provided back to top of the vertical reactor stack 102. As illustrated in FIG. 1, regenerated catalyst can be provided to the catalyst surge vessel 112 in catalyst stream 110.

Referring to FIG. 1, as described above, the gas stream comprising hydrogen 106 can be divided into one or more portions, such as first hydrogen feed stream portion 106a, second hydrogen feed stream portion 106b, third hydrogen stream portion 106c, fourth hydrogen feed stream portion 106d, fifth hydrogen feed stream portion 106e, sixth hydrogen feed stream portion 106f, seventh hydrogen feed stream portion 106g, and feed stream portion 106h.

The hydrocarbon feed stream 104 for the hydroprocessing reaction can be provided to a first mixer 158, where it can be combined with first a agent feed stream portion 106a. As illustrated, the mixers are external to the moving bed radial flow reactors. It should be understood, however, that the mixers described herein could alternatively be internal to the moving bed radial flow reactors. First reactor feed stream 160 can be provided from the first mixer 158, and can be injected into an outer annulus 162 of the first reactor 116. First reactor feed stream 160 can be in a liquid phase, and can contain the hydrocarbon feed stream 104 and the first gas stream comprising hydrogen portion 106a. First reactor feed stream 160 can also contain a circulation stream 164 of the reactor effluent from the second reactor 118, which can be provided to the first mixer 158 by first circulation loop 166. In an alternative embodiment, a circulation stream can be separated from a reactor effluent stream from another moving bed radial flow reactor downstream of the second moving bed radial flow reactor, and can be provided to the first mixer.

The first moving bed radial flow reactor 116 can include a first outer annulus 162, a first centerpipe 168 having a first centerpipe outlet 172, and a first reaction zone 292a containing catalyst. First reactor feed stream 160 can flow radially inward from the outer annulus 162 of the first reactor 116 towards the first centerpipe 168 of the first reactor 116. As the first reactor feed stream 160 flows radially inward through the first reactor 116, it passes through catalyst 114 in the first reaction zone 292a and can undergo hydroprocessing to produce a first reactor effluent stream 170 that can be removed from the first reactor 116 via a first centerpipe outlet 172. First reactor effluent stream 170 can be in a liquid phase.

First reactor effluent stream 170 can be provided to second mixer 174 through the second mixer inlet 138, where it can be mixed with second hydrogen feed stream portion 106b to form second reactor feed stream 176. The first reactor effluent stream 170 can have a pressure at the second mixer inlet 138 that is lower than a pressure of the first reactor effluent stream 170 when it is removed from the first reactor 116 through the first centerpipe outlet 172. Additionally, the second reactor feed stream 176 can have a pressure that is lower than the pressure of the first reactor effluent stream 172 at the second mixer inlet 138. The pressures of each subsequent reactor effluent stream and reactor feed stream can be designed in a similar manner. Such design of the pressures can facilitate flow of the of the reactor effluent streams and the reactor feed streams within the hydroprocessing system 100 without requiring a pump or raise in pressure to provide a reactor effluent stream to a mixer, and then provide a reactor feed stream from a mixer to the next reactor. A system design that does not require pumping of the reactor effluent streams or reactor feed streams can provide a reduction in the capital and operation costs associated with adding olefin injection points and increasing the internal i/o ratio of the reactors.

As illustrated in FIG. 2, the hydroprocessing system can include cooling a reactor effluent stream or a reactor feed stream to remove heat generated during the exothermic hydroprocessing reaction. For example, the hydroprocessing system can include cooling the first reactor effluent stream 170 or second reactor feed stream 176 in a cooling exchanger. In one example, the first reactor effluent stream 170 can be passed to a cooling exchanger 140a, to be cooled prior to being passed to the inlet 138 of the second mixer 174. In another example, the second reactor feed stream 176 can be passed from the second mixer 174 to a cooling exchanger 140b. In a hydroprocessing system where the pressure of the first reactor effluent is lower at the second mixer inlet 138 that at the first centerpipe outlet 172, and the pressure of the second reactor feed stream 176 is lower than the pressure of the first reactor effluent stream 170 at the second mixer inlet 138, the step of cooling the first reactor effluent stream 170 or the second reactor feed stream 176 can be accomplished without requiring a raise in pressure or pumping.

Referring to FIGS. 1 and 2, the second moving bed radial flow reactor 118 can include a second outer annulus 178, a second centerpipe 180 having a second centerpipe outlet 184, and a second reaction zone 292*b* containing catalyst. Second reactor feed stream 176 can be injected through a second reactor inlet 290 into the outer annulus 178 of the second reactor 118. As the second reactor feed stream 176 flows radially inward through the second reactor 118 to the second reactor centerpipe 180, it passes through catalyst 114 in the second reaction zone 292*b* and can undergo hydroprocessing to produce a second reactor effluent stream 182, which can be in a liquid phase, and can be removed from the second reactor 118 via a second centerpipe outlet 184.

As illustrated in FIG. 1, second reactor effluent stream 182 can be divided into at least two portions, including circulation stream 164 and reaction portion 186. Circulation stream 164 can be separated from the second reactor effluent stream 182, and can be provided to the first mixer through the first circulation loop 166. First circulation loop 166 can include at least one pump 188. First circulation loop 166 can also include at least one cooling exchanger 190, which can cool the circulation stream 164 prior to providing the circulation stream to the first mixer in order to remove heat generated during the hydroprocessing reaction. Reaction portion 186 of the second reactor effluent stream 182 can be provided to third mixer 192, where it can be combined with third gas feed stream comprising hydrogen portion 106*c*.

The third moving bed radial flow reactor 120 can include a third outer annulus 196, a third centerpipe 198 having a third centerpipe outlet 202, and a third reaction zone 292*c* containing catalyst. The third reactor feed stream 194 can be provided from the third mixer 192, and can be injected into an outer annulus 196 of the third reactor 120. Third reactor feed stream 194 can contain the reaction portion 186 of second reactor effluent stream 182 and third gas feed stream comprising hydrogen portion 106*c*. Third reactor feed stream 194 can also contain a circulation stream 204 of the effluent from the fourth reactor 122, which can be provided to the third mixer 192 by second circulation loop 206.

Third reactor feed stream 194 can flow radially inward from the outer annulus 196 of the third reactor 120 to the third centerpipe 198 of the third reactor 120. As the third reactor feed stream 194 flows radially inward through the third reactor 120, it passes through catalyst 114 in the third reaction zone 292*c* and can undergo hydroprocessing to produce a third reactor effluent stream 120 that can be removed from the third reactor 120 via a third centerpipe outlet 202. Third reactor effluent stream 200, which can be in a liquid phase, can be provided to fourth mixer 208, where it can be mixed with fourth gas feed stream comprising hydrogen portion 106*d* to form fourth reactor feed stream 210.

The fourth moving bed radial flow reactor 122 can include a fourth outer annulus 212, a fourth centerpipe 214 having a fourth centerpipe outlet 218, and a fourth reaction zone 292*d* containing catalyst. Fourth reactor feed stream 210 can be injected into the outer annulus 212 *f* the fourth reactor 122. Fourth reactor feed stream 210 can flow radially inward from the outer annulus 212 of the fourth reactor 122 to the fourth centerpipe 214 of the fourth reactor 122. As the fourth reactor feed stream 210 flows radially inward through the fourth reactor 122, it passes through catalyst 114 in the fourth reaction zone 292*d* and can undergo hydroprocessing to produce a fourth reactor effluent stream 216, which can be in a liquid phase, and can be removed from the fourth reactor 122 via a fourth centerpipe outlet 218.

Fourth reactor effluent stream 216 can be divided into at least two portions, including circulation stream 204 and reaction portion 220. Circulation stream 204 of the fourth reactor effluent stream 216 can be provided to second circulation loop 206. Second circulation loop 206 can include at least one pump 222. Second circulation loop 206 can also include at least one cooling exchanger 224, which can cool the circulation stream 204 of the fourth reactor effluent stream 216 to remove heat generated during the hydroprocessing reaction to remove heat generated during the hydroprocessing reaction. Reaction portion 220 of the fourth reactor effluent stream 216 can be provided to fifth mixer 226, where it can be combined with fifth gas feed stream comprising hydrogen portion 106*e*.

The fifth moving bed radial flow reactor 124 can include a fifth outer annulus 230, a fifth centerpipe 236 having a fifth centerpipe outlet 240, and a fifth reaction zone 292*e* containing catalyst. Fifth reactor feed stream 228 can be provided from the fifth mixer 226, and can be injected into an outer annulus 230 of the fifth reactor 124. Fifth reactor feed stream 228 can contain the reaction portion 220 of fourth reactor effluent stream 216 and fifth gas feed stream comprising hydrogen portion 106*e*. Fifth reactor feed stream 228 can also contain a circulation stream 232 of the effluent from the sixth reactor 126, which can be provided to the fifth mixer 226 by third circulation loop 234.

Fifth reactor feed stream 228 can flow radially inward from the outer annulus 230 of the fifth reactor 124 to the fifth centerpipe 236 of the fifth reactor 124. As the fifth reactor feed stream 228 flows radially inward through the fifth reactor 124, it passes through catalyst 114 in the fifth reaction zone 292*e* and can undergo hydroprocessing to produce a fifth reactor effluent stream 238 that can be removed from the fifth reactor 124 via a fifth centerpipe outlet 240. Fifth reactor effluent stream 238, which can be in a liquid phase, can be provided to sixth mixer 242, where it can be mixed with sixth gas feed stream comprising hydrogen portion 106*f* to form sixth reactor feed stream 244.

The sixth moving bed radial flow reactor 126 can include a sixth outer annulus 246, a sixth centerpipe 248 having a sixth centerpipe outlet 252, and a sixth reaction zone 292*f* containing catalyst. Sixth reactor feed stream 244 can be injected into the outer annulus 246 of the sixth reactor 126. Sixth reactor feed stream 244 can flow radially inward from the outer annulus 246 of the sixth reactor 126 to the sixth centerpipe 248 of the sixth reactor 126. As the sixth reactor feed stream 244 flows radially inward through the sixth reactor 126, it passes through catalyst 114 in the sixth reaction zone 292*f* and can undergo hydroprocessing to produce a sixth reactor effluent stream 250, which can be in a liquid phase, and can be removed from the sixth reactor 126 via a sixth centerpipe outlet 252.

Sixth reactor effluent stream 250 can be divided into at least two portions, including circulation stream 232 and reaction portion 254. Circulation stream 232 of the sixth reactor effluent stream 250 can be provided to third circulation loop 234. Third circulation loop 234 can include at least one pump 256. Third circulation loop 234 can also include at least one cooling exchanger 258, which can cool the circulation stream 232 of the sixth reactor effluent stream 250 to remove heat generated during the hydroprocessing reaction. Reaction portion 254 of the sixth reactor effluent stream 250 can be provided to seventh mixer 260, where it can be combined with seventh gas feed stream comprising hydrogen portion 106*g*.

The seventh moving bed radial flow reactor 128 can include a seventh outer annulus 264, a seventh centerpipe 268 having a seventh centerpipe outlet 272, and a seventh reaction zone 292*g* containing catalyst. Seventh reactor feed stream 262 can be provided from the seventh mixer 260, and can be injected into an outer annulus 264 of the seventh reactor 128. Seventh reactor feed stream 262 can contain the reaction portion 254 of sixth reactor effluent stream 250 and seventh gas feed stream comprising hydrogen portion 106g. Seventh reactor feed stream 262 can also contain a circulation stream 264 of the effluent from the eighth reactor 130, which can be provided to the seventh mixer 260 by fourth circulation loop 266.

Seventh reactor feed stream 262 can flow radially inward from the outer annulus 264 of the seventh reactor 128 to the seventh centerpipe 266 of the seventh reactor 128. As the seventh reactor feed stream 262 flows radially inward through the seventh reactor 128, it passes through catalyst 114 in the seventh reaction zone 292g and can undergo hydroprocessing to produce a seventh reactor effluent stream 270 that can be removed from the seventh reactor 128 via a seventh centerpipe outlet 272. Seventh reactor effluent stream 272, which can be in a liquid phase, can be provided to eighth mixer 274, where it can be mixed with eighth gas feed stream comprising hydrogen portion 106h to form eighth reactor feed stream 276.

The eighth moving bed radial flow reactor 130 can include a eighth outer annulus 278, a eighth centerpipe 280 having a eighth centerpipe outlet 284, and a eighth reaction zone 292h containing catalyst. Eighth reactor feed stream 276 can be injected into the outer annulus 278 of the eighth reactor 130. Eighth reactor feed stream 276 can flow radially inward from the outer annulus 278 of the eighth reactor 130 to the eighth centerpipe 280 of the eighth reactor 130. As the eighth reactor feed stream 276 flows radially inward through the eighth reactor 130, it passes through catalyst 114 in the eighth reaction zone 292h and can undergo hydroprocessing to produce a eighth reactor effluent stream 282 that can be removed from the eighth reactor 130 via a eighth centerpipe outlet 284.

The eighth reactor effluent stream 282 can be divided. A recirculation stream 264 of the eighth reactor effluent stream 282 can be provided to the fourth circulation loop 266. Fourth circulation loop 266 can include at least one pump 286. Fourth circulation loop 266 can also include at least one cooling exchanger 288, which can cool the circulation stream 264 of the eighth reactor effluent stream 282 to remove heat generated during the hydroprocessing reaction. The remaining portion of eighth reactor effluent stream 282 can be removed from the hydroprocessing system 100 as effluent product stream 108. In at least one example, the effluent product stream 108 can be provided to a downstream unit, such as an isostripper, for further processing.

FIG. 3 illustrates an hydroprocessing system 300 that includes a first vertical reactor stack 302 and a second vertical reactor stack 304. As discussed above, the first vertical reactor stack 302 and the second vertical reactor stack each include six moving bed radial flow reactors. The hydroprocessing system 300 can function in a similar manner to hydroprocessing system 100 with respect to the structure of the moving bed radial flow reactors, and the flow scheme of the reactor feed streams and reactor effluent streams.

A hydrocarbon feed stream 330 and an gas feed stream comprising hydrogen 332 can be provided through lines to the first reactor stack 302, and the hydroprocessing system 300 can produce an effluent product stream 334. The gas feed stream comprising hydrogen is preferably divided into portions, and a hydrogen injection point is preferably provided for each moving bed radial flow reactor in the first reactor stack 302 and the second reactor stack 304. As illustrated in FIG. 3, the gas feed stream comprising hydrogen is divided into twelve portions, 332a through 332l, and each portion of the gas feed stream comprising hydrogen is provided to a mixer that provides a reactor feed stream to one of the moving bed radial flow reactors.

As illustrated in FIG. 3, the hydrocarbon feed stream 330 and the first gas feed stream comprising hydrogen portion 332a are provided to a first mixer 340. A circulation stream 338 can be separated from the reactor effluent stream of a reactor downstream of the first reactor 306, and can also be provided to the first mixer 340. First mixer 340 can provide a first reactor feed stream 336 to the first moving bed radial flow reactor 306.

Catalyst 342 can be provided to the first reactor 306 from a catalyst surge vessel 344 that receives a catalyst stream 346. The catalyst stream 346 can contain fresh catalyst, regenerated catalyst, or a combination of fresh and regenerated catalyst. The catalyst 342 can flow downward through a reaction zone in each reactor in the first vertical reactor stack 302, and can participate in the hydroprocessing reaction occurring in each reaction zone. Catalyst can be removed from the first reactor stack 302 in a first reactor stack catalyst stream 348. Catalyst 350 from the first reactor stack catalyst stream 348 can be provided to a second catalyst surge vessel 352 at the top of the second vertical reactor stack 304. In one example, fresh or regenerated catalyst can also be provided to the second catalyst surge vessel 352, or at least a portion of the catalyst in the first reactor stack catalyst stream 348 can be regenerated prior to being provided to the second catalyst surge vessel 352. Catalyst 350 can flow downward through a reaction zone in each reactor in the second vertical reactor stack 304, and can participate in the hydroprocessing reaction occurring in each reaction zone. A deactivated catalyst stream 354 can be removed from the bottom of the second vertical reactor stack 304.

The first reactor feed stream 336 can undergo an hydroprocessing reaction in the reaction zone of the first moving bed radial flow reactor 306, and a first reactor effluent stream can be removed from the first moving bed radial flow reactor 306. The first reactor effluent stream and the second alkylating agent feed stream portion 332b can be provided to a second mixer 358 that provides a second reactor feed stream 360 to the second reactor 308.

The hydroprocessing system 300, like the hydroprocessing system 100 discussed above, can be designed so that the pressure of the first reactor effluent stream is lower at the second mixer inlet than the pressure when it is removed from the first reactor, and so that the pressure of the second reactor feed stream is lower than the pressure of the first reactor effluent stream at the second mixer inlet. The pressures of each subsequent reactor effluent stream and reactor feed stream can be similarly designed.

The second reactor feed stream 360 can undergo an hydroprocessing reaction in the reaction zone of the second moving bed radial flow reactor 308, and a second reactor effluent stream 362 can be removed from the second moving bed radial flow reactor 308. The second reactor effluent stream and the third gas feed stream comprising hydrogen stream portion 332c can be provided to a third mixer 364 that provides a third reactor feed stream 366 to the second reactor 310.

The third reactor feed stream 366 can undergo an hydroprocessing reaction in the reaction zone of the third moving bed radial flow reactor 310, and a third reactor effluent stream 368 can be removed from the third moving bed radial flow reactor 310. A circulation stream 338 can be separated from the third reactor effluent stream 368, and the remainder can be provided, along with the fourth gas feed stream comprising hydrogen stream portion 332d to a fourth mixer 370 that provides a fourth reactor feed stream 372 to the fourth reactor 312.

The fourth reactor feed stream 372 can undergo an hydroprocessing reaction in the reaction zone of the fourth moving bed radial flow reactor 312, and a fourth reactor effluent stream 374 can be removed from the fourth moving bed radial flow reactor 312. The fourth reactor effluent stream and the fifth alkylating agent feed stream portion 332e can be provided to a fifth mixer 376 that provides a fifth reactor feed stream 378 to the fifth reactor 314.

The fifth reactor feed stream 378 can undergo an hydroprocessing reaction in the reaction zone of the fifth moving bed radial flow reactor 314, and a fifth reactor effluent stream 380 can be removed from the fifth moving bed radial flow reactor 314. The fifth reactor effluent stream 380 and the sixth alkylating agent feed stream portion 332f can be provided to a sixth mixer 382 that provides a sixth reactor feed stream 384 to the sixth reactor 316, which is the bottom reactor in the first vertical reactor stack 302.

A sixth reactor effluent stream 386 can be removed from the sixth reactor 316. A circulation stream 388 can be separated from the sixth reactor effluent stream 386 and can be passed to an upstream mixer, such as fourth mixer 370, where it can be mixed into a reactor feed stream. At least a portion of the remainder of the sixth reactor effluent stream 386 can be passed to the top of the second vertical reactor stack 304 to undergo further hydroprocessing.

As illustrated in FIG. 3, sixth reactor effluent stream 386 and seventh gas feed stream comprising hydrogen stream portion 332g can be provided to a seventh mixer 388 that provides a seventh reactor feed stream 390 to the first reactor 318 of the second vertical reactor stack 304.

The seventh reactor feed stream 390 can undergo an hydroprocessing reaction in the reaction zone of the first moving bed radial flow reactor 318 of the second vertical reactor stack 304, and a seventh reactor effluent stream 392 can be removed from the first moving bed radial flow reactor 318 of the second vertical reactor stack 304. The seventh reactor effluent stream 392 and the eighth alkylating agent feed stream portion 332h can be provided to a eighth mixer 394 that provides a eighth reactor feed stream 396 to the second moving bed radial flow reactor 320 of the second vertical reactor stack 304.

The eighth reactor feed stream 396 can undergo an hydroprocessing reaction in the reaction zone of the second moving bed radial flow reactor 320 of the second vertical reactor stack 304, and an eighth reactor effluent stream 398 can be removed from the second moving bed radial flow reactor 320 of the second vertical reactor stack 304. The eighth reactor effluent stream 398 and the ninth alkylating agent feed stream portion 332i can be provided to a ninth mixer 400 that provides a ninth reactor feed stream 402 to the third moving bed radial flow reactor 322 of the second vertical reactor stack 304.

The ninth reactor feed stream 403 can undergo an hydroprocessing reaction in the reaction zone of the third moving bed radial flow reactor 322 of the second vertical reactor stack 304, and a ninth reactor effluent stream 404 can be removed from the third moving bed radial flow reactor 322 of the second vertical reactor stack 304. A circulation stream 406 can be separated from the ninth reactor effluent stream 404 and can be provided to an upstream mixer to be combined into a reactor feed stream. The remainder of the ninth reactor effluent stream 404 and the tenth alkylating agent feed stream portion 332j can be provided to a tenth mixer 408 that provides a tenth reactor feed stream 410 to the fourth moving bed radial flow reactor 324 of the second vertical reactor stack 304.

The tenth reactor feed stream 410 can undergo an hydroprocessing reaction in the reaction zone of the fourth moving bed radial flow reactor 324 of the second vertical reactor stack 304, and a tenth reactor effluent stream 412 can be removed from the fourth moving bed radial flow reactor 324 of the second vertical reactor stack 304. The tenth reactor effluent stream 412 and the eleventh alkylating agent feed stream portion 332k can be provided to an eleventh mixer 414 that provides an eleventh reactor feed stream 416 to the fifth moving bed radial flow reactor 326 of the second vertical reactor stack 304.

The eleventh reactor feed stream 416 can undergo an hydroprocessing reaction in the reaction zone of the fifth moving bed radial flow reactor 326 of the second vertical reactor stack 304, and an eleventh reactor effluent stream 418 can be removed from the fifth moving bed radial flow reactor 326 of the second vertical reactor stack 304. The eleventh reactor effluent stream 418 and the twelfth alkylating agent feed stream portion 332l can be provided to a twelfth mixer 420 that provides an twelfth reactor feed stream 422 to the sixth moving bed radial flow reactor 328, which is the bottom reactor of the of the second vertical reactor stack 304.

The twelfth reactor feed stream 422 can undergo an hydroprocessing reaction in the reaction zone of the sixth moving bed radial flow reactor 328 of the second vertical reactor stack 304, and the alkylate effluent product stream 334 can be removed from the sixth moving bed radial flow reactor 328 of the second vertical reactor stack 304. A circulation stream 424 can be separated from the alkylate effluent product stream 334, and can be provided to an upstream mixer to be combined into a reactor feed stream.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

The invention claimed is:

1. A process for hydroprocessing comprising:
providing at least two moving bed reactors, the moving bed reactors including:
a first moving bed reactor including a first reaction zone containing catalyst; and
a second moving bed reactor including a second reaction zone containing catalyst;
transferring catalyst, periodically or continuously, from the first reaction zone of the first moving bed reactor to the second reaction zone of the second moving bed reactor;
passing a liquid feed stream comprising a hydrocarbonaceous feed stream and hydrogen to the first reactor, wherein the liquid feed stream undergoes a hydroprocessing reaction in the first reaction zone to produce a first reactor effluent stream, and first reactor effluent stream is removed from an outlet of the first reactor;
passing the first reactor effluent stream though one or more unit operations wherein the pressure of the first reaction zone effluent stream at the first unit operation is lower than the pressure of the first reactant effluent stream at the outlet of the first reaction zone, and the pressure at the inlet of all subsequent unit operations is lower than the prior upstream operation, to generate a liquid phase or substantially liquid phase stream;
passing the liquid phase or substantially liquid phase stream to the second reaction zone, the liquid phase stream having a pressure at the second reaction zone inlet that is lower than a pressure of the liquid phase or substantially liquid phase stream at the inlet of the last unit operation, wherein the liquid phase or substantially liquid phase stream undergoes hydroprocessing to generate a second reactor effluent stream; and passing the second reactor stream from the second or a final reaction zone to a product recovery zone.

2. The process of claim 1 wherein a first unit operation is a mixing device in which the first reactor effluent stream is mixed with a stream selected from the group consisting of a gas stream containing hydrogen and a liquid phase hydrocarbonaceous stream to generate a mixing device effluent.

3. The process of claim 2 wherein a second unit operation is a separation device wherein the mixing device effluent is separated into a vapor portion and a liquid portion.

4. The process of claim 1 wherein a unit operation is a cooling device wherein the first reactor effluent stream is cooled prior to entering the second reaction zone.

5. The process of claim 1 wherein the liquid feed stream boils in the range from about 315 to 566° C. (600° F. to 1050° F.).

6. The process of claim 1 wherein one or more reaction zones is a hydrotreating zone.

7. The process of claim 6 where the hydrotreating zone is operated at conditions including a temperature from 222 to 500° C. (400° F. to 900° F.) and a pressure from 3447 to 17,237 kPa (500 psig to 2500 psig).

8. The process of claim 1 wherein one or more reaction zones is a hydrocracking zone.

9. The process of claim 8 where the hydrocracking zone is operated at conditions including a temperature from 250 to 486° C. (450° F. to 875° F.) and a pressure from 3447 to 17,237 kPa (500 psig to 2500 psig).

10. The process of claim 1 wherein the catalyst is transferred from the first moving bed reaction zone to the second moving bed reaction zone through at least one catalyst transfer pipe.

11. The process of claim 1 wherein the liquid flow in at least one reactor is primary downward though the moving bed.

12. The process of claim 1 wherein the liquid flow in at least one reactor is primary horizontally or radially through the moving bed.

13. The process of claim 1 wherein a least a portion of the liquid phase effluent from one or more reaction zones is recirculated to an inlet to one or more reaction zones.

14. The process of claim 1 wherein the moving bed reactors are radial flow moving bed reactors.

15. The process of claim 1, wherein the plurality of moving bed reactors are configured in at least one vertical reactor stack having a top and a bottom, the vertical reactor stack comprising at least four moving bed reactors.

16. The process of claim 15, further comprising the steps of:
removing catalyst from the bottom of the vertical reactor stack in a deactivated catalyst stream;
regenerating the deactivated catalyst to produce regenerated catalyst; and
providing the regenerated catalyst to the top of the vertical reactor stack.

17. The process of claim 16, the vertical reactor stack further comprising a catalyst surge vessel at the top of the vertical reactor stack above the first reactor, wherein the regenerated catalyst is provided to the catalyst surge vessel, and the catalyst surge vessel provides catalyst to the first moving bed radial flow reactor through at least one catalyst transfer pipe.

18. The process of claim 1, wherein the plurality of moving bed reactors are configured in at least a first vertical reactor stack and a second vertical reactor stack.

19. The process of claim 1 wherein the catalyst is transferred from the first moving bed reaction zone to the second moving bed reaction zone through at least one catalyst transfer pipe while the catalyst is submerged in a liquid portion of the first reactor effluent stream; and wherein the relative velocity of the liquid portion in the catalyst transfer pipe to the catalyst in the catalyst transfer pipe ranges from about 1.5 to about 123 cm/s (about 0.05 to about 4.0 feet per second).

20. The process of claim 1:
wherein the at least two moving bed reactors are a plurality of moving bed radial flow reactors configured in at least one vertical reactor stack having a top and a bottom including:
a first moving bed radial flow reactor including a first outer annulus, a first centerpipe having a first centerpipe outlet, and a first reaction zone containing catalyst; and
a second moving bed radial flow reactor including a second outer annulus, a second centerpipe having a second centerpipe outlet, and a second reaction zone containing catalyst;
wherein the transferring of catalyst from the first reaction zone to the second reaction zone is through at least one catalyst transfer pipe;
further comprising generating the liquid feed stream by passing a gas stream comprising hydrogen and a liquid phase hydrocarbonaceous feed stream to a first mixer;
wherein the passing of the liquid feed stream to the first reactor further comprises receiving the liquid feed stream by the first outer annulus, flowing the liquid feed stream radially inward through the first reaction zone towards the first centerpipe;
wherein the first reactor effluent stream is removed from an outlet of the first reactor through the first centerpipe outlet at a first pressure;
wherein the one or more unit operations comprise a second mixer that produces the liquid phase or substantially liquid phase stream; and
wherein the passing of the liquid phase or substantially liquid phase stream to the second reaction zone further comprises receiving the liquid phase or substantially liquid phase stream by the second outer annulus, flowing the liquid phase or substantially liquid phase stream radially inward through the second reaction zone towards the second centerpipe, and removing the second reactor effluent stream from the second reactor through the second centerpipe outlet.

21. The hydroprocessing process of claim 20, further comprising the steps of:
removing catalyst from the bottom of the vertical reactor stack in a deactivated catalyst stream;
regenerating the deactivated catalyst to produce regenerated catalyst; and
providing the regenerated catalyst to a catalyst surge vessel at the top of the vertical reactor stack, above the first reactor wherein the regenerated catalyst is provided to the catalyst surge vessel, and the catalyst surge vessel provides catalyst to the first moving bed radial flow reactor through at least one catalyst transfer pipe.

22. The process of claim 20 wherein the catalyst in the catalyst transfer pipe is submerged in a liquid portion of the first reactor effluent stream; and wherein the relative velocity of the liquid in the catalyst transfer pipe to the catalyst in the catalyst transfer pipe ranges from about 1.5 to about 123 cm/s (about 0.05 to about 4.0 feet per second).

* * * * *